(12) United States Patent
Hatano et al.

(10) Patent No.: US 6,331,881 B1
(45) Date of Patent: *Dec. 18, 2001

(54) LIQUID CRYSTAL DEVICE WITH COMPOSITE LAYER OF CURED RESIN PILLARS AND LIQUID CRYSTAL PHASE AND METHOD OF PRODUCING THE SAME

(75) Inventors: Takuji Hatano, Suita; Masakazu Okada, Kyoto, both of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,402

(22) Filed: May 4, 1998

(30) Foreign Application Priority Data

May 9, 1997 (JP) .................................................... 9-119981

(51) Int. Cl.⁷ .......................... G02F 1/1333; G02F 1/1339
(52) U.S. Cl. .............................. 349/86; 349/88; 349/156
(58) Field of Search ............................ 349/86, 88, 156, 349/185, 187

(56) References Cited

U.S. PATENT DOCUMENTS

| | | | |
|---|---|---|---|
| 3,578,844 | 5/1971 | Kettering et al. | 350/160 |
| 5,437,811 | 8/1995 | Doane et al. | 252/299.01 |
| 5,473,450 | 12/1995 | Yamada et al. | 359/51 |
| 5,539,546 | 7/1996 | Koden et al. | 359/51 |
| 5,636,043 * | 6/1997 | Uemura et al. | 359/81 |
| 5,729,319 * | 3/1998 | Inou et al. | 349/156 |
| 5,731,861 * | 3/1998 | Hatano et al. | 349/169 |
| 5,739,882 * | 4/1998 | Shimizu et al. | 349/123 |
| 5,751,382 * | 5/1998 | Yamada et al. | 349/12 |
| 5,771,084 * | 6/1998 | Fujimori et al. | 349/153 |
| 5,784,137 * | 7/1998 | Shiomi et al. | 349/88 |
| 5,790,218 * | 8/1998 | Koden et al. | 349/92 |
| 5,831,703 * | 11/1998 | Nishiguchi et al. | 349/117 |
| 5,847,798 * | 12/1998 | Yang et al. | 349/169 |
| 5,940,156 * | 8/1999 | Nishiguchi et al. | 349/156 |
| 6,015,507 * | 1/2000 | Kobayashi et al. | 252/299.01 |
| 6,124,908 * | 9/2000 | Kobayashi et al. | 349/106 |
| 6,130,738 * | 10/2000 | Hatano et al. | 349/156 |

* cited by examiner

Primary Examiner—William L. Sikes
Assistant Examiner—Tarifur R. Chowdhury
(74) Attorney, Agent, or Firm—Sidley Austin Brown & Wood

(57) ABSTRACT

A liquid crystal device comprises a pair of substrates; and a composite layer disposed between the pair of substrates, the composite layer including a resin phase and a liquid crystal phase of a liquid crystal material exhibiting cholesteric characteristic, the composite layer having an area defining one pixel, and the area including a plurality of regions being different from each other in condition of the resin phase. A method of producing a liquid crystal device comprises the steps of defining an area corresponding to one pixel; and forming a plurality of regions of composite layer in the area, the composite layer including a resin phase and a liquid crystal phase of a liquid crystal material exhibiting cholesteric characteristic, and each of the regions being different from the others in condition of the resin phase. The step of forming the regions may include the steps of supplying a composition of the liquid crystal material and the resin material into a space between the paired substrates; and separating the liquid crystal material in a region corresponding to each of the regions from the resin under a condition different from the others. If the resin material is a photo-curing resin material, the separating step may include the steps of masking the composition with a mask having a plurality of regions, each of which has a plurality of openings and is different from the others in condition of the openings; and exposing the composition to light through the mask.

57 Claims, 8 Drawing Sheets

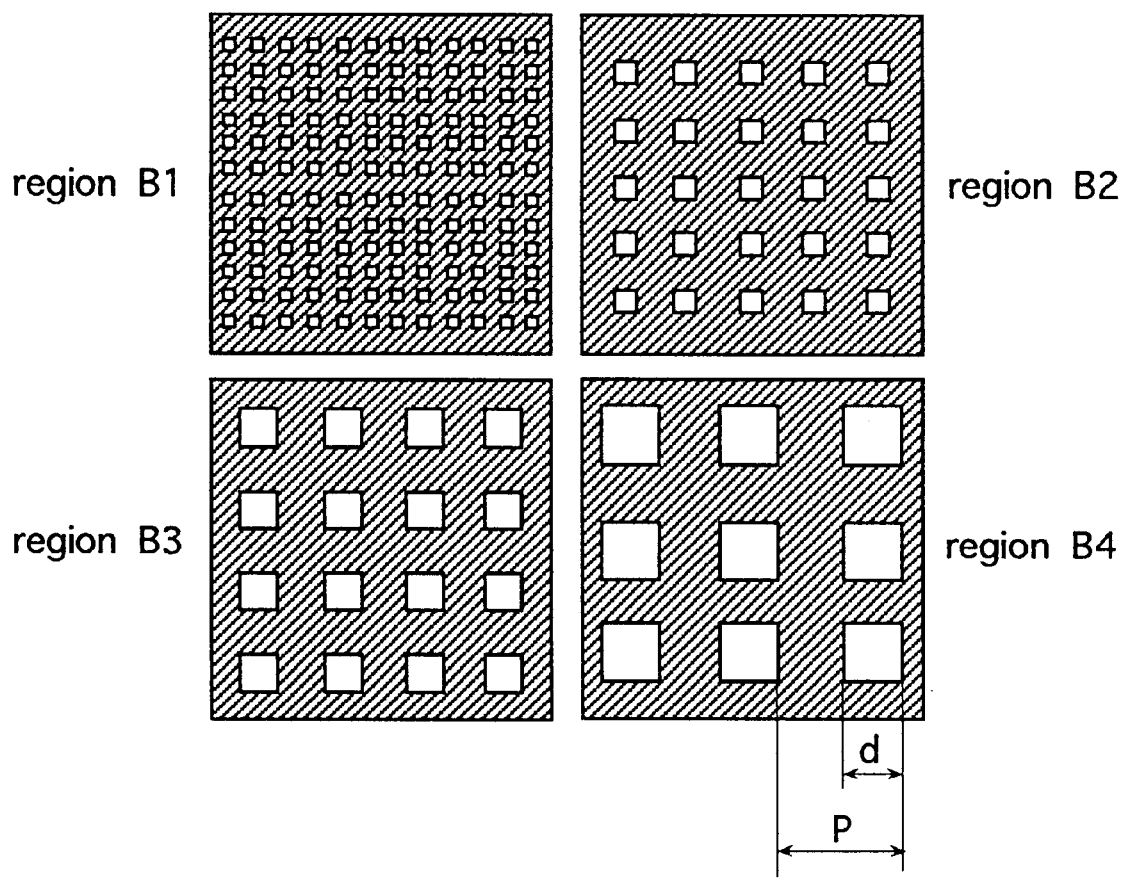

LIQUID CRYSTAL DEVICE WITH COMPOSITE LAYER OF CURED RESIN PILLARS AND LIQUID CRYSTAL PHASE AND METHOD OF PRODUCING THE SAME

This application is based on application No. 9-119981 (119981/1997) Pat. filed in Japan, the contents of which is hereby incorporated by reference.

BACKGROUND OF THE INVENTION

1. Field of the Invention

The present invention relates to a liquid crystal device having a composite layer, which includes a liquid crystal phase of a liquid crystal material exhibiting a cholesteric characteristic and a resin phase, and a method of producing the same.

2. Description of the Background Art

Various kinds of liquid crystal display devices having a memory effect have already been proposed.

U. S. Pat. No. 3,578,844 has disclosed a liquid crystal device, in which cholesteric liquid crystal material capsuled with a polymer such as gelatin or gum arabi is held between a pair of substrates. This liquid crystal device has a memory effect, and performs a predetermined display when supplied with a voltage, as disclosed therein. The state of the display is stably maintained even after the cease of application of the voltage. This liquid crystal device performs the display by utilizing a difference in quantities of reflected light, which is caused by changing, in accordance with the voltage application, the orientation state of cholesteric liquid crystal material having a selective reflection wavelength in a visible range.

The liquid crystal device, which has the composite layer including the polymer material and the cholesteric liquid crystal material, can perform a high resolution display by simple matrix driving without requiring a memory element such as TFT, MIM. However, it has an insufficient self-holding property or form-keeping property, and therefore is liable to change its display state when a pressure is externally applied thereto. Also, it cannot achieve a sufficient contrast.

A reflective liquid crystal device utilizing selective reflection of the cholesteric liquid crystal material changes the display state in accordance with a planar orientation in which helical axes of liquid crystal molecules are perpendicular to the substrate and a focal conic orientation in which the helical axes are irregularly directed or are substantially parallel to the substrate. If the helical axes of liquid crystal molecules are oriented excessively uniformly in the planar orientation, the displayed appearance is significantly affected by a viewing angle. For example, even if the device is transparent in appearance when viewed perpendicularly to the substrate, it exhibits an opaque appearance as the viewing direction shifts from the direction vertical to the substrate.

Further, in the cholesteric liquid crystal material which selectively reflects the light in the visible range, a color tone can be adjusted by controlling the helical pitch length. However, control of the brightness is difficult, and display in half brightness and multi-tone of brightness is difficult.

Regarding the dependency on the viewing angle, U.S. Pat. No. 5,437,811 has disclosed that the dependency on the viewing angle is improved in a liquid crystal device in which a chiral nematic liquid crystal material containing resin added thereto at a rate of 10% by weight or less with respect to the whole weight and exhibiting a cholesteric characteristic is held between a pair of substrates. In this liquid crystal device, addition of a small amount of resin causes a mutual action between the resin and the liquid crystal material at a region near the resin, and thereby the liquid crystal near the resin exhibits a response to an applied electric field when, compared with the liquid crystal material remote from the resin so that the dependency on the viewing angle is improved.

According to the above method in which a small amount of resin is added to the liquid crystal material, however, a self-holding property cannot sufficiently be achieved because the amount of the added resin is small. Therefore, a state of display is liable to change due to a pressure applied to the substrate surface. Although this problem can be avoided by increasing the amount of the added resin, this causes other problems such as rising of a required drive voltage and lowering of a contrast.

Meanwhile, U.S. Pat. No. 5,473,450 has disclosed a liquid crystal device having a composite film or layer which includes resin partitions formed between pixels or picture elements as well as liquid crystal regions formed between the partitions. This partition structure is formed in such a manner that a solution of liquid crystal material and resin is radiated with ultraviolet rays through a photomask so that a portion radiated with ultraviolet rays is cured to form a resin wall which corresponds to the photomask and forms the above partition structure.

The liquid crystal device having the above partition structure of resin can suppress flow of the liquid crystal material, and therefore has a high self-holding property. Further, the forms of the liquid crystal regions can be uniform and can be positioned accurately. Therefore, drive voltages for the respective liquid crystal regions can be uniform so that it is possible to reduce the drive voltage required for simultaneously operating all the liquid crystal regions. Since each liquid crystal region has a relatively large size defined by the partition, the device can provide a better contrast than a liquid crystal device in which fine liquid crystal regions are arranged in resin portions. Such an advantage can also be achieved that sealing is not required at the periphery of the substrate.

However, these do not overcome the problem that the half tone display and therefore multi-tone display is difficult because the cholesteric liquid crystal material exhibits a bistability.

The resin partitions may be formed by a polymerization phase separating method. However, this method may suffer from such a problem that an uncured raw material of resin remains in the liquid crystal material so that the remaining ingredient lowers the phase transition temperature (clearing point) of the liquid crystal material, and/or shifts the selective reflection wavelength of the liquid crystal material. According to this method, the liquid crystal material is liable to be taken into the resin wall or partition, which may lower the strength, the durability and the adhesivity to the substrate of the resin. Further, the range from which resin material can be selected is restricted to a certain extent.

SUMMARY OF THE INVENTION

An object of the invention is to provide a liquid crystal device which can easily perform a multi-tone display using a liquid crystal material which exhibits cholesteric characteristic as well as a method of producing the same.

It is also an object of the invention to provide a method of producing a liquid crystal device having a pair of substrates and a composite layer, which is held between the substrates and includes a resin phase and a liquid crystal phase of a liquid crystal material exhibiting cholesteric characteristic, and particularly a method capable of producing a liquid crystal device which is not influenced by an uncured resin material and has a resin phase not containing liquid crystal material, and capable of selecting a resin material from a wide range.

According to an aspect of the invention, there is provided a liquid crystal device comprising a pair of substrates; and a composite layer disposed between said pair of substrates, said composite layer including a resin phase and a liquid crystal phase of a liquid crystal material exhibiting cholesteric characteristic, said composite layer having an (at least one) area defining one pixel, said area including a plurality of regions being different from each other in condition of said resin phase.

According to another aspect of the invention, there is provided a method of producing a liquid crystal device comprising the steps of defining an (at least one) area corresponding to one pixel; and forming a plurality of regions of composite layer in said area, said composite layer including a resin phase and a liquid crystal phase of a liquid crystal material exhibiting cholesteric characteristic, and each of said regions being different from the others in condition of said resin phase.

The step of forming the regions may include the steps of supplying a composition of the liquid crystal material and the resin material to a space between the paired substrates, and separating the liquid crystal material in a region corresponding to each of said regions from the resin under a condition different from those in the other regions. In this case, said area is defined between the paired substrates.

The step of forming the regions may include the steps of supplying the resin material to a space between a first substrate and a provisional substrate; curing the resin material in a region corresponding to each of said regions under a condition different from those in the other regions; removing the provisional substrate; removing an uncured resin material; supplying the liquid crystal material into a space formed by the cured resin; and arranging a second substrate at a position previously occupied by the provisional substrate and holding the resin and the liquid crystal material between the first and second substrates. In this case, said area is defined between the first substrate and the provisional substrate.

The step of forming the regions may include the steps of supplying the resin material to a space between a first substrate and a provisional substrate; curing the resin material in a region corresponding to each of said regions under a condition different from those in the other regions; removing the provisional substrate; removing an uncured resin material; arranging a second substrate at a position previously occupied by the provisional substrate and holding the resin between the first and second substrates; and supplying the liquid crystal material into a space between the first and second substrates. In this case, said area is defined between the first substrate and the provisional substrate. The liquid crystal phase is set to be continuously present in the composite layer.

In the structure wherein the liquid crystal phase is continuously present in the composite layer, the step of forming the regions may include the steps of supplying the resin material into a space between the paired substrates, curing the resin material in a region corresponding to each of said regions under a condition different from those in the other regions; removing an uncured resin material; and supplying the liquid crystal material into a space between the paired substrates. In this case, said area is defined between the paired substrates. The liquid crystal phase is set to be continuously present in the composite layer.

The step of forming said regions may include the steps of providing a mask having a plurality of regions each having a plurality of openings and being different from the others in condition of said openings; and applying a resin onto a first substrate in accordance with the openings of said mask. In this case, said area is defined on the first substrate. The step of forming said regions may further include the steps of supplying the liquid crystal material into a space formed by the resin; and holding the resin and the liquid crystal material between the first substrate and a second substrate. Alternatively, if the liquid crystal phase is set to be continuously present in the composite layer, the step of forming said regions may further include the steps of sandwiching the resin between the first substrate and a second substrate; and supplying the liquid crystal material into a space between the first and second substrates.

The foregoing and other objects, features, aspects and advantages of the present invention will become more apparent from the following detailed description when taken in conjunction with the accompanying drawings.

BRIEF DESCRIPTION OF THE DRAWINGS

FIG. 3 shows a photomask used for producing the liquid crystal device of a specific embodiment of the invention;

DESCRIPTION OF THE PREFERRED EMBODIMENTS

Figure 1A:
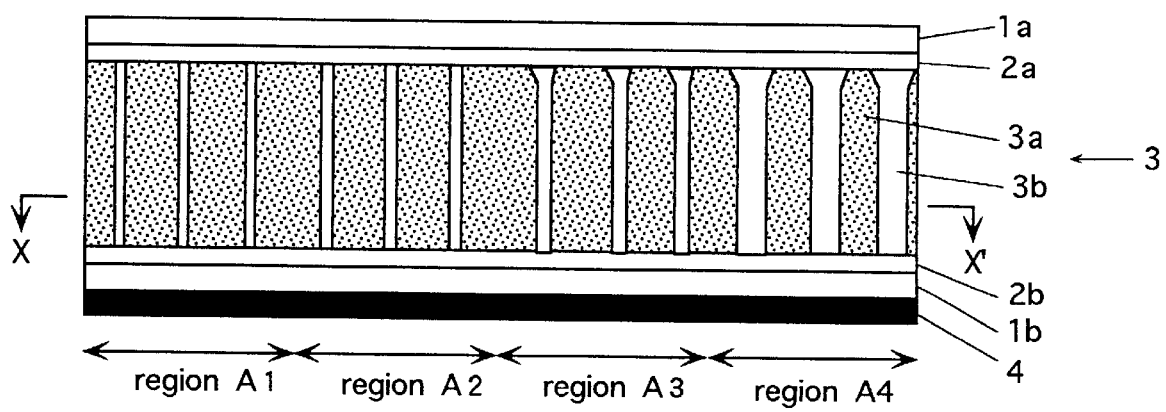
FIG. 1(A) is a cross section showing an example of a liquid crystal device of an embodiment of the invention and more specifically showing a portion corresponding to one pixel.

A liquid crystal device of an embodiment of the invention includes a pair of substrates, and a composite layer disposed between the paired substrates. The composite layer includes a resin phase and a liquid crystal phase of a liquid crystal material exhibiting a cholesteric characteristic or phase. The composite layer has an (at least one) area defining one pixel and including a plurality of regions being different from each other in condition or state of the resin phase.

The resin phase may be a resin wall. The resin wall may take the form of, e.g., pillars, a network, a wall providing a continuous liquid crystal region, a partition dispersing the liquid crystal material to a plurality of regions in one pixel. The resin wall usually extends between the paired substrates. The resin wall in the partition form may be formed in a non-display region between the pixels, and the resin wall in any one of the foregoing forms may be formed within one pixel. In any case, the resin wall has such a form that the composite layer can have a sufficient self-holding property, and an external pressure can hardly change the state of display even if the substrate holding the composite layer is made of a flexible material.

In particular, the resin wall preferably takes the form of pillars or columns. This is because the pillar form can increase the area of contact with the liquid crystal material and therefore can promote a mutual reaction with the liquid crystal material so that the memory effect of the liquid crystal material exhibiting the cholesteric characteristic is stabilized. As will be described later, the pillar form offers such an advantage that a difference between drive voltages required for the respective regions, which are different in form of the resin wall and others from each other, can be increased, and a dependency on a viewing angle can be effectively improved. Such an advantage can also be achieved that production of a gas bubble in the composite layer is suppressed. In this case, the resin wall can be formed by polymerization phase separation from a mixture of the liquid crystal material and the resin material (i.e., a resin raw material), and also can be formed by forming resin pillars between the paired substrates, and thereafter supplying the liquid crystal material into a space between the substrates, as will be described later.

A spacing by the resin wall is determined such that, in the process of forming the resin wall by the polymerization phase separation by exposure through a mask, which will be described later, the raw material of resin does not flocculate due to a concentration difference during the phase separation, and that the raw material of resin does not remain a space formed by the resin wall, which may occur by polymerization or the like due to an influence of light diffraction at the mask boundary during exposure through the mask. The spacing depends on the kind of resin, the kind of liquid crystal material, the polymerization speed of the resin material and others.

Each of the regions may be different in strength and/or form (configuratin) of the resin phase. If the composite layer has a plurality of resin pillars as the resin phase, the intensity or strength of the resin pillar is determined, for example, by the pitch and density of the resin pillars. Thus, in the structure employing the composite layer which has a plurality of resin pillars as the resin phase, each region may be different in pitch, density and/or form (configuratin) of the resin pillars from the others.

Further, the composite layer may contain a large number of liquid crystal droplets or a large number of liquid crystal microcapsules dispersed in the resin phase. In this case, a plurality of regions, which are different in diameter or the like of the liquid crystal droplet or liquid crystal capsule from each other, are present in the area corresponding to one pixel, similarly to the foregoing cases.

The paired substrates may have electrodes, respectively, between which the foregoing area is defined. The area in the composite layer corresponds to one pixel formed by these electrodes. If the substrate is transparent, the transparent electrode is employed. The transparent electrode may be made of ITO (Indium Tin Oxide), $SnO_2$, $InO_3$ or the like, or may be made of a thin metal film.

The electrodes can form the pixel by employing such a structure that at least one of the electrodes takes the form of a matrix, or that one of the electrodes is formed of a large number of parallel line-like members, and the other is formed of a large number of parallel line-like members perpendicular to them.

The liquid crystal device of the embodiment of the invention can be manufactured by the steps of defining the area corresponding to one pixel, and forming the plurality of regions of the composite layer in the defined area.

The step of forming the regions may include the steps of supplying a composition of the liquid crystal material and the resin material (i.e., the raw material of the resin) into a space between paired substrates; and separating the liquid crystal material in a region corresponding to each of the regions from the resin under a condition different from those in the other regions. In this case, the foregoing area is defined between the paired substrates.

If the resin material is a photo-curing resin material, the separating step may include the steps of masking the composition with a mask having a plurality of regions, each of which has a plurality of openings and is different from the others in condition of the openings; and exposing the composition to light through the mask.

More specifically, the liquid crystal device of the embodiment of the invention can be manufactured, for example, by the following method. A pair of plates provided with electrodes are prepared. At least one of the plates provided with electrodes is transparent. These plates and a spacer disposed therebetween are attached together with inner sides of the electrodes directed inward. A space between the plates is filled with a mixture liquid. The mixture liquid is made of a liquid crystal material exhibiting cholesteric characteristic at a room temperature, monomers and/or oligomers of a raw material of photo-curing resin (e.g., raw material of ultraviolet-curing resin) and a polymerization initiator mixed at a predetermined ratio. Then, a photomask having a predetermined pattern is disposed outside the transparent plate, and radiation is performed with rays (e.g., ultraviolet rays) having a predetermined intensity of illumination through the photomask at a temperature equal to or higher than the clearing point of the liquid crystal material exhibiting cholesteric characteristic. Thereby, the resin monomers or the like are cured at a portion radiated with the rays so that phase separation occurs between the liquid crystal material and the resin, and the resin phase corresponding to the mask form is formed.

If the resin phase is made of a plurality of resin pillars, each region in the foregoing mask may be different in pitch, density and/or form of the openings from the others, whereby the pitch, density and/or forms (configurations) of the resin pillars formed at each region in the composite layer may be different from that (or those) of the others.

If the resin phase is in the network form, the resin phase is formed such that a plurality of regions, which are different in density of mesh openings or the like from each other, are present in the area corresponding to one pixel. More specifically, in the process of the polymerization phase separation which is performed by radiating the composition of the liquid crystal material and the resin material of the photo-curing resin with light, an ND filter having portions providing different light transmittances from each other in one pixel is laid on the plate. Thereby, growth of the resin can be controlled in several different manners in the area corresponding to one pixel so that the network resin phase made of several portions having different densities or the like of mesh openings from each other can be formed in the area corresponding to one pixel. In the structure where the composite layer includes the liquid crystal droplets dispersed in the resin phase, this composite layer can be formed by the phase separation method. In this case, the intended structure can be formed by performing the phase separation that a plurality of regions, which are different in diameter or the like are present in the area corresponding to one pixel.

Furthermore, in the structure where the composite layer includes the liquid crystal microcapsules dispersed in the resin phase, the composite layer can be formed by spreading a resin material, dispersing a plurality of microcapsules on the spread resin material so that microcapsules different in diameter are respectively located in regions of the area corresponding to one pixel, and then curing the resin material.

The "plates" holding the composite layer may conceptually include flexible or less flexible plate-like members, flexible films or the like. For example, one of the paired plates may be a plate having a hardness which allows holding of the composite layer, and the other may be a member such as a film for protecting the composite layer.

If the plate nearer to the exposure light source were thick, it would be impossible to form the resin phase having an intended form due to an influence of spreading and diffraction of exposure rays. Therefore, the thickness of the plate nearer to the exposure light source is preferably about 0.5 mm or less, although it depends on an optical system for the exposure. More preferably, it is about 0.2 mm or less. The exposure is preferably performed by projection exposure because it is less affected by stray light. However, contact exposure may be employed, in which case the plate near the light source preferably has a thickness equal to or smaller than a thickness which is about ten times larger than the minimum form of the mask pattern (minimum size of the exposure opening pitch).

For curing the raw material of resin by radiation of light (e.g., ultraviolet rays), the plate near the light source is preferably made of a material which neither scatters nor absorbs the light (e.g., ultraviolet rays). For example, it may be glass, polyethylene terephthalate, polycarbonate, polyether sulfone or the like.

The foregoing liquid crystal material exhibiting cholesteric characteristic may be, for example, a cholesteric liquid crystal material or a chiral nematic liquid crystal material made of a nematic liquid crystal material and a chiral ingredient added thereto for providing a predetermined helical pitch length.

The nematic liquid crystal material may be a material containing, e.g., cyanobiphenyl, tolane or pyrimidine, and having a positive dielectric anisotropy. More specifically, MN1000XX (manufactured by Chisso Co., Ltd.) as well as ZLI-1565 and BL-009 (both manufactured by Merck Co., Ltd.) may be available. The chiral ingredient may be a compound having asymmetric carbon and inducing an optical rotation. More specifically, S-811, S-1011, CB15, CE2 (all manufactured by Merck Co., Ltd.) and others may be available. Cholesteric nonanoate (manufactured by Merck Co., Ltd.) of cholesteric liquid crystal material may be used as a chiral ingredient. The property of MN1000XX is disclosed in U.S. Pat. No. 5,731,861.

The raw resin material may preferably be ultraviolet-curing monomers and/or oligomers, and more specifically may preferably be monomers and/or oligomers of mono-functional or multifunctional acrylate or methacrylate in view of a mutual action with the liquid crystal material, reliability, adhesivity to the plate and others.

The polymerization initiator may be a material which induces radical polymerization of resin when radiated with light (e.g., ultraviolet light). More specifically, the polymerization initiator may be, for example, DAROCUR 1173 or IRGACUR 184 (both manufactured by Chiba Gaigy Co., Ltd) which induces radical polymerization of resin when radiated with ultraviolet light.

The polymerization phase separation is performed at a temperature that the liquid crystal material attains an isotropic phase, i.e., a temperature equal to or higher than the clearing point of the liquid crystal material. If performed at a temperature lower than the above, partial separation of the liquid crystal material occurs during the polymerization phase separation so that ultraviolet rays are scattered, resulting in lowering of the contrast. Also, the separated liquid crystal material may adhere onto the plate, and thereby may reduce the adhesivity between the plate and the composite layer.

For cutting the component of light scattered due to a disclination between liquid crystal domains in the liquid crystal phase, a minute amount of dye may be added into the liquid crystal material, or a color filter may be arranged outside the plate on the light reflecting side. The dye may have such characteristics that can absorb spectral rays of the wavelengths other than spectral rays to be selectively reflected by the liquid crystal material. This can improve the contrast. In this case, the dye may be taken into either the liquid crystal phase or the resin phase. The dye to be added to the liquid crystal phase or the resin phase may be dichroic pigment for a liquid crystal display such as SI-426 or M-483 (both manufactured by Mitsui Toatsu Senryo Co., Ltd.).

The spacer may be made of plastics, glass or the like, and for example, may be sprayed on the plate in advance, or may be mixed to the raw material of resin in advance. The spacer has a diameter substantially equal to or slight smaller than an intended thickness of the composite layer. This is because that the thickness of the composite layer is substantially determined by the height of the resin phase, but slightly exceeds the height of the resin phase.

In the structure where the liquid crystal device using the liquid crystal material exhibiting cholesteric characteristic is to be driven by application of the voltage, two kinds of, i.e., high and low pulse voltages are applied to switch the orientation state of the liquid crystal molecules between the planar orientation state and the focal conic orientation state. The switched state is stably held even after stop of voltage application.

The liquid crystal material exhibiting cholesteric characteristic selectively reflects the rays of a wavelength corresponding to a product of the helical pitch length and the average refractive index of the liquid crystal material when it is in the planar orientation wherein the helical axes are oriented perpendicularly to the substrate. Therefore, by employing the liquid crystal materials of which selective reflection wavelengths are in a red range, a blue range and a green range, respectively, the liquid crystal materials in the planar orientation selectively reflect the rays of the respective wavelengths to perform display in red, blue and green.

By layering the liquid crystal layers of the respective colors, display in multiple colors can be performed. By setting the selective reflection wavelength in a range such as an infrared range, a transparent appearance is exhibited. In the structure employing a chiral nematic liquid crystal material, the helical pitch length can be controlled by controlling an amount of added chiral ingredient, whereby the selective reflection wavelength can be controlled.

The liquid crystal material exhibiting cholesteric characteristic exhibits an opaque appearance by scattering the incident rays when it is in the focal conic state and thus its helical axes are oriented irregularly. If the liquid crystal material exhibiting cholesteric characteristic has the selective reflection wavelength, for example, in a visible range, it has a short helical pitch length so that the scattering is reduced. Therefore, the helical axes are oriented substantially parallel to the plate. In this case, a nearly transparent appearance can be exhibited.

Accordingly, by switching the state between the planar state and the focal conic state, it is possible to perform the display between the selective reflection state (planar state) and the transparent state (focal conic state), display between the transparent state (planar state) and the opaque state (focal conic state) and others. The selective reflection wavelength may be set in a visible range, and a background layer of an appropriate color may be arranged outside the plate remote from the viewing side. Thereby, the display can be performed between the selective reflection state (planar state) and the background color state (focal conic state) and others.

In the liquid crystal device of the embodiment of the invention, the liquid crystal material exhibiting cholesteric characteristic may have, typically, the selective reflection wavelength in the visible range.

Figure 1B:
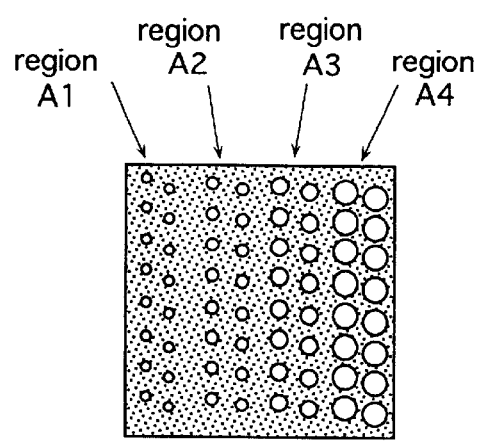
FIG. 1(B) is a cross section of the liquid crystal device taken along line X–X' in FIG. 1(A)

FIG. 1(A) shows a cross section of a liquid crystal device of an embodiment of the invention thus formed, and particularly shows a portion corresponding to one pixel. In the liquid crystal device, a pair of transparent substrates or plates 1a and 1b, which are provided with transparent electrodes 2a and 2b in matrix forms, respectively, are attached together with the transparent electrodes 2a and 2b directed inward, and a composite layer 3 is held between the plates 1a and 1b. A black light absorber layer 4 is disposed outside the plate 1b. The composite layer 3 in this embodiment is formed of a liquid crystal phase 3a and a resin phase 3b is formed of resin pillars. Four regions A1, A2, A3 and A4 which are different in diameter and form of the resin pillar 3b from each other are present in one pixel. FIG. 1B shows, on a reduced scale, a cross section of the composite layer 3 taken along line X–X' in FIG. 1(A).

As shown in FIG. 1(A), each resin pillar has a slightly sloped end. Therefore, when a voltage is applied across the transparent electrodes 2a and 2b, an electric field produced thereby crosses the resin pillar 3b and the voltage applied is divided between the liquid crystal phase 3a and the resin pillar 3b. The sloped structure of the end is formed by the following reason. Since the rays (e.g., ultraviolet rays) are radiated from outside one of the plates, the space in which polymerization of resin monomers or the like is achieved expands during the polymerization. Thus, the resin wall has an expanded structure at the ray radiation side where the polymerization started first. For achieving uniform polymerization, it is preferable that the rays for radiation are parallel rays. However, the form of the resin pillar can be controlled by controlling the diverging angle and incident angle of the rays.

Figure 2A:
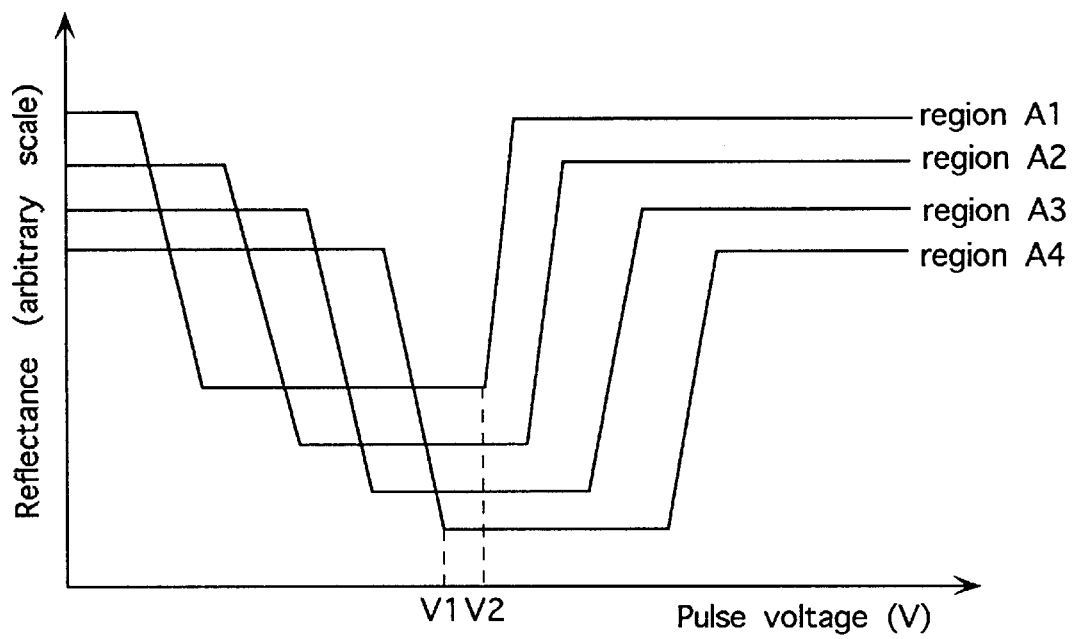
FIG. 2 is a graph schematically showing a relationship between a magnitude of a pulse voltage applied to a composite layer of the liquid crystal device shown in FIGS. 1(A) and 1(B) and reflectances of regions A1–A4.
FIG. 2(B) is a graph schematically showing a relationship between the magnitude of the pulse voltage and the reflectance of the whole pixel including the regions A1–A4.

According to the liquid crystal device of the embodiment of the invention, each pixel in the composite layer includes the plurality of regions different in state or condition of the resin phase from each other. Therefore, the applied voltage is divided by the resin phase to various extents depending on the regions, and the voltage actually applied to the liquid crystal material in each region differs from the voltages applied to the liquid crystal material in the other regions. In the structure wherein the resin phase is formed of the resin pillar, the composite layer includes the plurality of regions which are different, e.g., in density, arrangement pitch and/or form of the resin pillars so that the degree or extent of division of the applied voltage, which is caused in each region by the inclination of the end of the resin pillar, differs from those in the other regions, and therefore the magnitude of the voltage which is actually applied to the liquid crystal material in each region differs from those in the other regions. Movement of the liquid crystal molecules is restricted by a mutual action (anchoring) with the resin phase to an extent, which depends on the form and others of the resin phase. As a result, the drive voltage required for setting each region to an intended state differs from that for the other regions, and the regions exhibit different reflectances, respectively, when the predetermined voltage is applied thereto., FIG. 2(A) schematically shows a relationship between the magnitude of the pulse voltage applied between the transparent electrodes 2a and 2b in the liquid crystal device in FIG. 1(A) and the reflectances of the regions A1–A4. In this liquid crystal device, the selective reflection wavelength of the liquid crystal material is outside the infrared range so that the liquid crystal material exhibits a transparent appearance when it is in the planar state, and exhibits an opaque appearance when it is in the focal conic state. The liquid crystal material is in the planar state when it is in the initial state. As shown in FIG. 2(A), the voltage attaining the focal conic state (low-reflectance state) and the voltage attaining the planar state (high-reflectance state) again in each region differ from those in the other regions.

Figure 2B:
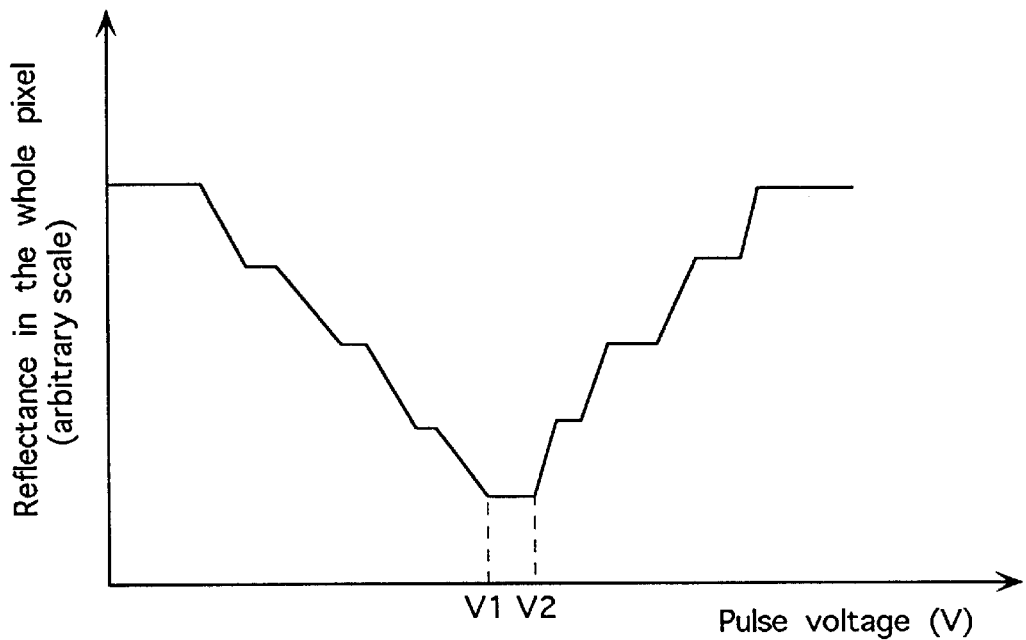

FIG. 2(B) schematically shows a relationship between the magnitude of the pulse voltage and the reflectance in the whole pixel including regions A1–A4. The reflectance in the whole pixel is an average value of the reflectances of the respective regions. Therefore, many reflectance states are present between the state that all the regions A1–A4 are in the planar state and the state that all the regions A1–A4 are in the focal conic state. Accordingly, a multi-tone display can be performed by controlling the magnitude of the voltage applied to the composite layer. For example, a cholesteric liquid crystal material which is controlled to have the selective reflection wavelength in a green range may be used, whereby a multi-tone display can be performed between the green and the black.

It is assumed that, in the composite layer (pixel) of the liquid crystal device shown in FIGS. 1(A) and 1(B), the regions A4 requires a voltage V1 for changing from the planar state to the focal conic state, and this voltage V1 is higher than the voltages required by the other regions for changing their states in the same manner. Also, it is assumed that the region A1 in the pixel requires a voltage V2 for returning from the focal conic state to the planar state, and this voltage V2 is lower than the voltages required by the other regions for returning in the same manner. In this case, it is preferable that the voltage V1 is lower than the voltage V2 because this relationship can set all the regions to the focal conic state and can attain the state of the lowest reflectance.

The liquid crystal device of the embodiment of the invention has the resin phase and therefore a high self-holding property, and can suppress change in display state which may be caused by an externally applied pressure even if the plate is soft. In an extreme case, the composite layer may be held between the paired film-like plates to provide the liquid crystal device having a sheet-like form.

Owing to presence of the resin phase, the orientation of the liquid crystal molecules in the planar state is disarranged so that the dependency on the viewing angle is improved.

In the method of producing the liquid crystal device of the embodiment of the invention, the foregoing step of forming the regions may include the steps of (1) supplying the resin material into a space between a first substrate and a provisional substrate, (2) curing the resin material in a region corresponding to each of said regions under a condition different from those in the other regions; (3) removing the provisional substrate; (4) removing an uncured resin material; (5) supplying the liquid crystal material into a space formed by the cured resin; and (6) arranging a second substrate at a position previously occupied by the provisional substrate, and holding the resin and the liquid crystal material between the first and second plates. In this case, said area is defined between the first substrate and the provisional substrate.

In particular, if the resin material is a photo-curing resin material, the above step (2) may include the steps of masking the resin material with a mask having a plurality of regions, each of which has a plurality of openings and is different from the others in condition of the openings; and exposing said resin material to light through said mask.

More specifically, a transparent plate (first plate), which is provided with a transparent electrode, a provisional plate and spacers disposed therebetween are attached together with the electrode directed inward. A space between the plates is filled with a mixture liquid. The mixture liquid is made of monomers and/or oligomers of a raw material, e.g., of ultraviolet-curing resin and a polymerization initiator mixed at a ratio from 1% to 3% by weight with respect to the whole weight. Then, a photomask having a predetermined pattern is located outside the first plate, and radiation is performed with ultraviolet rays having a predetermined intensity of illumination through the photomask. Thereby, the resin monomers and/or oligomers are cured at a portion radiated with the rays so that the resin phase is formed.

The conditions similar to those for forming of the resin phase by the polymerization phase separating method already described may be employed with respect to available liquid crystal material exhibiting cholesteric characteristic, raw resin material, form of the resin phase, polymerization initiator, plates, electrodes, spacer and photomask as well as dye, color filter or the like for cutting scattered components of the light.

Then, the provisional plate is peeled off with the resin phase remained on the first plate. This processing of peeling off the provisional plate can be performed easily by employing, for example, such a simple manner that a thin layer of peeling agent (e.g., Ceparack RA450 manufactured by Yamaichi Kagaku Kogyo Co., Ltd.) is applied to the provisional plate in advance for reducing the adhesivity between the provisional plate and the composite layer, or that a polyethylene terephthalate (PET) film having a good releasing property is used as the provisional plate, although not restricted to these manners. Further, a coupling agent (e.g., Sila-Ace S710 manufactured by Chisso Co., Ltd.) may be spread on the first plate in advance for improving the adhesivity between the resin phase and the first plate.

Then, an uncured raw resin material is removed by washing with organic solvent. The organic solvent is required not to affect the formed resin phase, and may be ethanol, methanol, isopropyl alcohol (IPA), hexane or the like.

Then, a space in the resin phase is filled with the liquid crystal material after removing the uncured resin material by washing, and the resin and liquid crystal material are sandwiched between the first plate and a new plate (second plate) provided with an electrode. The peripheries of the plates are sealed with an adhesive or the like. If the resin phase has a wall form sealing the peripheries of the plates, the foregoing sealing with the adhesive is not necessary.

In the manner described above, the liquid crystal device is produced. In this liquid crystal device, the composite layer including the liquid crystal phase of the liquid crystal material exhibiting cholesteric phase and the resin phase is held between the plates, and the composite layer has an (at least one) area defining one pixel and including a plurality of regions being different from each other in condition of the resin phase.

In the above method, the liquid crystal material may be supplied into the space between the first and second plates after removing the uncured resin material, arranging the second plate and holding the resin phase between the first and second plates. In this case, the resin phase may take the form of pillars or a network, and the liquid crystal phase may be continuously present without being divided by the resin phase.

According to the method described above, there is no possibility that an uncured raw resin material remains in the liquid crystal phase, and it is possible to avoid lowering of the phase transition temperature of the liquid crystal material, shifting of the selective reflection wavelength and others, which may be caused by the residue. There is no possibility that the liquid crystal material is taken into the resin phase so that it is possible to avoid disadvantages such as lowering of the intensity of the resin phase, lowering of the durability of the resin phase and lowering of the adhesivity of the resin phase to the plates, which may be caused by mixing of the liquid crystal material into the resin phase. If the polymerization phase separation method is employed for forming the resin phase, the resin material can be selected only from a restricted range, for example, due to such reasons that a compatibility between the liquid crystal material and the raw resin material is required, and that some kinds of materials of the liquid crystal and resin do not allow the phase separation. However, the above method allows selection of the resin material from a wide range for producing the liquid crystal device.

In the method of manufacturing the liquid crystal device of the embodiment of the invention, the foregoing step of forming the regions may include the steps of (1) supplying the resin material into a space between paired plates, (2) curing the resin material in a region corresponding to each of said regions under a condition different from those in the other regions; (3) removing an uncured resin material; and (4) supplying the liquid crystal material into the space between the paired plates. In this case, the area is defined between the paired plates. The resin phase may be set to take the form of, e.g., pillars or a network, and the liquid crystal phase may be set to be continuously present without being divided by the resin phase.

Particularly, if the resin material is a photo-curing resin material, the foregoing step (2) may include the steps of masking the resin material with a mask having a plurality of regions, each of which has a plurality of openings and is different from the others in condition of the openings; and exposing the resin material to light through the mask.

More specifically, a pair of transparent plates, which are provided with transparent electrodes, and a spacer disposed therebetween are attached together with the electrodes directed inward. A space between the plates is filled with a mixture liquid. The mixture liquid is made of monomers and/or oligomers of a raw material, e.g., of ultraviolet-curing resin and a polymerization initiator mixed at a ratio from 1% to 3% by weight with respect to the whole weight. Then, a photomask having a predetermined pattern is located outside the first plate, and radiation is performed with ultraviolet rays having a predetermined intensity of illumination through the photomask. Thereby, the resin monomers and/or oligomers are cured at a portion radiated with the rays so that the resin phase is formed.

Then, similarly to the above method employing the provisional plate, an uncured raw resin material is removed by washing. Then, a space in the resin phase is filled with the liquid crystal material after removing the uncured resin material by washing, and the peripheries of the plates are sealed with an adhesive or the like. If the resin phase has a wall form sealing the peripheries of the plates, the foregoing sealing with the adhesive is not necessary.

The conditions similar to those for forming the resin phase by foregoing method using the provisional plate may be employed with respect to available liquid crystal material exhibiting cholesteric characteristic, raw resin material, form of the resin phase, polymerization initiator, plates, electrodes, spacer and photomask as well as dye, color filter or the like for cutting scattered components of the light.

Similar to the foregoing method, this method can achieve the following advantages. There is no possibility that an uncured raw resin material remains in the liquid crystal phase, and it is possible to avoid lowering of the phase transition temperature of the liquid crystal material, shifting of the selective reflection wavelength and others, which may be caused by the residue. There is no possibility that the liquid crystal material is taken into the resin phase so that it is possible to avoid disadvantages such as lowering of the intensity of the resin phase, lowering of the durability of the resin phase and lowering of the adhesivity of the resin phase to the plates, which may be caused by mixing of the liquid crystal material into the resin phase. Compared with the polymerization phase separation method, the above method allows selection of the resin material from a wide range for producing the liquid crystal device.

In the method of producing the liquid crystal device of the embodiment of the invention, the step of forming the regions may include the steps of: providing a mask having a plurality of regions, each of which has a plurality of openings and is different from the others in condition of the openings; and applying the resin onto a first plate in accordance with the openings of the mask. In this case, the foregoing area is defined on the first plate.

The step of forming the regions may further include the steps of supplying the liquid crystal material into the space formed by the resin, and holding the resin and the liquid crystal material between the first plate and a second plate.

Alternatively, if the composite layer is set to include the liquid crystal phase which is continuously present without being divided by the resin phase takes the form of, e.g., pillars or a network, the step of forming the regions may further include the steps of holding the resin between the first plate and a second plate, and supplying the liquid crystal material into the space between the first and second plates.

More specifically, the resin is applied onto the first plate by a printing method, in which printing on the plate is performed by squeezing the resin with a squeezee through a screen plate or a metal mask. When squeezing the resin with the squeezee, the plate may be supported by a plate-like support member, if necessary.

The resin used in this method is not restricted to the photo-curing resin. With respect to the thermal characteristics, the resin may be either a thermosetting resin or a thermoplastic resin. The thermosetting resin may be epoxy resin or acrylic resin. The thermoplastic resin may be polyvinyl chloride resin, polyvinylidene chloride resin, polyvinyl acetate resin, polymethacrylic acid ester resin, polyacrylic acid ester resin, polystyrene resin, polyamide resin, polyethylene resin, polypropylene resin, fluorocarbon resin, polyurethane, polyacrylonitrile resin, polyvinyl ether resin, polyvinyl ketone resin, polyether resin, polyvinyl pyrrolidone resin, saturated polyester resin, polycarbonate resin, chlorinated polyether resin or the like. only one kind of resin may be selected from the above, or two or more kinds of resin may be selected from the above for use in combination. It is desired to use the thermosetting resin which has a softening point higher than the transition temperature of the liquid crystal material to the isotropic phase.

When actually used, it is desired to prepare a paste of the resin, for example, by solving the resin with appropriate solvent. It is preferable that the resin applied onto the plate has a height which is larger than the intended thickness of the composite layer but does not exceed a value five times larger than the same. More preferably, the resin applied onto the plate has a height which is larger than the intended thickness of the composite layer but does not exceed a value three times larger than the same.

By a known spraying method such as a wet method or a dry method, the spacers are sprayed onto at least one of the plates, and the pair of plates are overlaid on each other to form an empty cell. The plates are arranged such that the surfaces provided with the electrodes are opposed to each other. Overlaying of the plates may be performed in a reduced pressure. This can suppress mixing of an air into the resin phase. The spacers may be mixed, in advance, into the resin. The spacers may be contained in both the resin phase and the liquid crystal phase.

Then, the paired plates which are overlaid on each other are heated while applying a pressure from the opposite sides so that the resin is softened. This application of the pressure is performed, for example, by applying the pressure to the paired plates by a pneumatic cylinder, moving the paired plates between paired rollers which are opposed together with a predetermined space therebetween, or by putting a plate member on the paired plates and moving a roller bearing a predetermined load over the plate member. When using the pneumatic cylinder, the paired plates may be held between paired plate members to which the pressure is applied from the pneumatic cylinder, if necessary. The heating may be performed, for example, by performing the above application of the pressure within a constant temperature chamber kept at a predetermined temperature, or by heating the plate members or rollers used for pressure application to a predetermined temperature. Thereafter, the plate pair is cooled so that the resin can be solidified.

The liquid crystal material is supplied into the empty cell thus formed in a known vacuum injection method. When supplying the liquid crystal material, the plates may be heated to a temperature lower than the softening point of the resin.

Instead of injection of the liquid crystal material, droplets of the liquid crystal material may be supplied onto one of the plates before overlaying the plates on each other, in which case the plates may likewise be heated to a temperature higher than the transition temperature of the liquid crystal material to the isotropic phase.

Instead of the printing method in which the resin is applied in accordance with the openings of the mask, the resin may be applied onto the first plate, e.g., by a dispensing method, an ink jet method or a transfer method. These methods are likewise performed to form finally the plurality of regions different from the others in condition of the resin phase in the area corresponding to one pixel. The dispensing method and the ink jet method are performed in such a manner that resin paste or the like is injected onto the plate from a nozzle. The transfer method is performed in such a manner that the resin is applied onto a plate member or a roller, and then is transferred onto the plate.

The kinds of available resin, spacer, methods of heating and pressuring the plates, method of supplying the liquid crystal material and others are similar to those in the printing method.

Similarly to the foregoing method, this method can achieve the following advantages. There is no possibility that an uncured raw resin material remains in the liquid crystal phase, and it is possible to avoid lowering of the phase transition temperature of the liquid crystal, shifting of the selective reflection wavelength and others, which may be caused by the residue. There is no possibility that the liquid crystal material is taken into the resin phase so that it is possible to avoid disadvantages such as lowering of the intensity of the resin phase, lowering of the durability of the resin phase and lowering of the adhesivity of the resin phase to the plates, which may be caused by mixing of the liquid crystal material into the resin phase. Compared with the polymerization phase separating method, the resin material can be selected from a wide range for producing the liquid crystal device.

Specific embodiments of the invention will now be described below. The invention is, however, not restricted to them.

Embodiment 1

A mixture, which included the nematic liquid crystal material MN1000XX and ZLI-1565 mixed at a weight ratio of 1:1, was mixed with the chiral material, which was a mixture of CN and S811 mixed at a weight ratio of 2:1, to produce a chiral nematic liquid crystal material A. This liquid crystal material A contained the chiral material at 35.4% by weight with respect to the whole mixture, and had the selective wavelength of 560 nm. The clearing point of the liquid crystal material A was 61.3° C. This liquid crystal material A and photo-curing resin, i.e., monomers of 2, 4-dibromophenol epoxy acrylate were mixed at a weight ratio of 8:2 to prepare a mixture. This mixture was supplied into a space between the plates of 0.2 mm in thickness, which carried spacers of 10 $\mu$m and were provided with a pair of transparent electrodes. Then, a photomask shown in FIG. 3 was arranged on the outside of one of the plates, and the plate was radiated with ultraviolet rays (15 mW/cm$^2$) through the photomask to cause polymerization of the resin monomers at a temperature of 65° C. To prevent reflection of the ultraviolet rays, a black absorbing layer was disposed on the background in this processing of radiating the ultraviolet rays. For simplicity reason, FIG. 3 shows a portion of the photomask corresponding to one pixel, but the actual photomask had a large number of portions corresponding to that shown in FIG. 3.

The photomask shown in FIG. 3 has four regions B1, B2, B3 and B4 corresponding to one pixel. These regions B1, B2, B3 and B4 are. different from each other in an arrangement pitch P of the openings, which correspond to resin pillars having a square cross section, respectively, and are also different from each other in a size d of one side of the opening. The region B1 has the pitch P of 30 $\mu$m and the size d of 10 $\mu$m (opening rate of 89%). The region B2 has the pitch P of 40 $\mu$m and the size d of 15 $\mu$m (opening rate of 86%). The region B3 has the pitch P of 60 $\mu$m and the size d of 25 $\mu$m (opening rate of 82%). The region B4 has the pitch P of 100 $\mu$m and the size d of 50 $\mu$m (opening rate of 75%).

After cooling the composite layer, the structure of the resin phase was observed with a polarization microscope. As a result, an isotropic resin region and a fan shape of the liquid crystal material in the focal conic orientation were found from either side of the plates, and it was found that the resin phase in the pillar form was formed.

Figure 4:
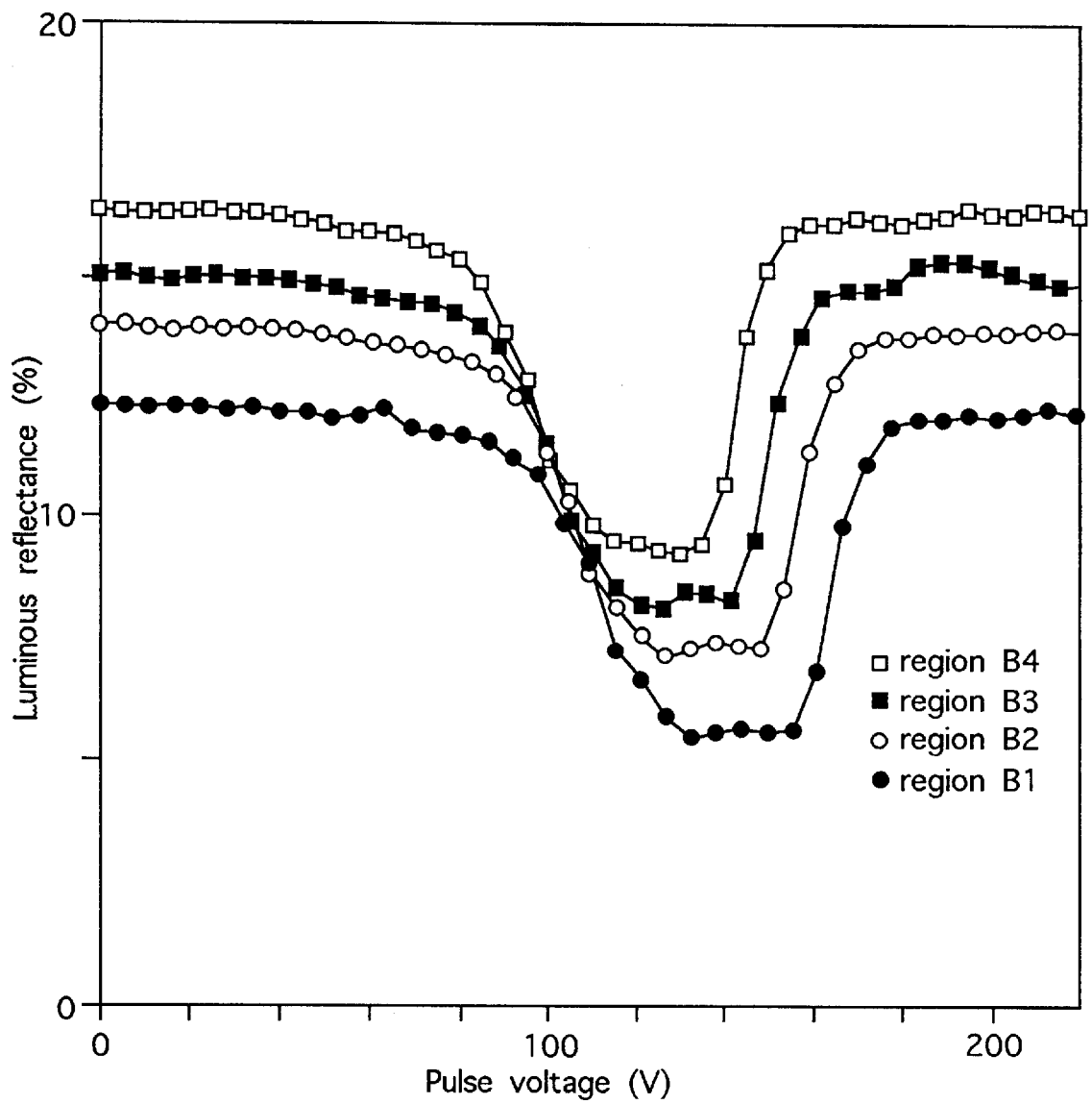
FIG. 4 shows a relationship between voltages applied on various regions and the luminous reflectances of the regions in the liquid crystal, device produced with the photomask shown in FIG. 3.

A high voltage pulse of ±200 V and 5 msec was applied across the electrodes of this liquid crystal device to form the planar orientation in the entire region, and then the peak value of the pulse voltage was changed to change the state of the liquid crystal material. Thereby, a multi-tone display could be performed. The luminous reflectances of the portions corresponding to the regions B1–B4 were measured with a spectrocolorimeter CM-1000 (manufactured by Minolta Co., Ltd., reflection type). However, it was difficult to measure the reflectance of the portions corresponding to the regions B1–B4 because an area of each portion was excessively small. Therefore, four kinds of photomasks, which had the same opening pitches P and the side length d of the opening as the regions B1–B4, respectively, were prepared, and four kinds of liquid crystal devices having the composite layers, each of which was formed of a single region, were prepared with these photomasks, respectively. The measurement of the reflectances were performed with these composite layers, respectively. The relationship between the magnitude of the voltage and the luminous reflectances of the respective regions are shown in FIG. 4. Since the respective regions exhibited different reflectance curves, respectively, it can be understood that the multi-tone display can be performed by providing a plurality of regions corresponding to the regions B1–B4 in one pixel.

Similarly to the foregoing, another liquid crystal device having the composite layer was prepared with a photomask, which had four regions C1, C2, C3 and C4 (corresponding to the regions B1, B2, B3 and B4, respectively) for one pixel. These regions C1, C2, C3 and C4 were different from each other in pitch P of the openings for exposure and length d of one side of the opening, which corresponded to the resin pillars each having a square cross section, respectively. The region C1 had the pitch P of 20 $\mu$m and the length d of 10 $\mu$m, the region C2 had the pitch P of 40 $\mu$m and the length d of 20 $\mu$m, the region C3 had the pitch P of 60 $\mu$m and the length d of 30 $\mu$m, and the region C4 had the pitch P of 100 $\mu$m and the length d of 50 $\mu$m. The regions C1, C2, C3 and C4 had the same opening rate of 75%.

Figure 5:
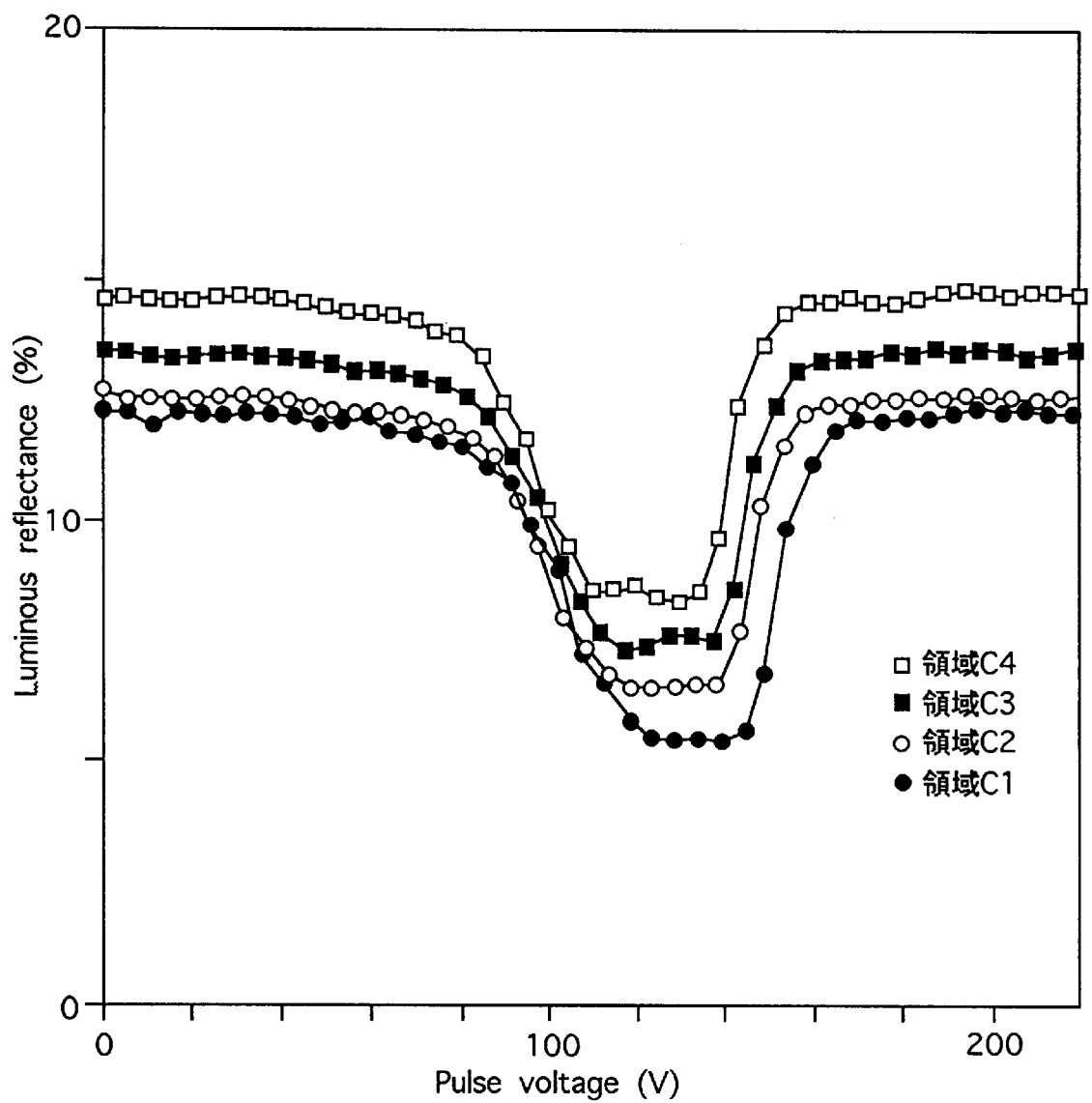
FIG. 5 shows a relationship between voltages applied on various regions and the luminous reflectances of the regions in a liquid crystal device of another specific embodiment of the invention.

Measurement was carried out on this liquid crystal device in the same manner as the foregoing. The relationship between the magnitude of the pulse voltage and the luminous reflectances of the respective regions are shown in FIG. 5. Similarly to the foregoing case, the respective regions exhibit different reflectance curves, and therefore it can be understood that a multi-tone display can be performed by providing the regions corresponding to the regions C1–C4 in one pixel. This liquid crystal device was different from the liquid crystal device produced with the photomask shown in FIG. 3 in pitch, form and others of the resin pillars in each region, and therefore was different in required drive voltage. The luminous reflectances of the respective portions corresponding to the regions C1–C4 were measured in the same manner as the measurement of the luminous reflectances of the portions corresponding to the respective regions B1–B4.

From FIGS. 4 and 5, it can be seen that the region having resin pillars, which have a smaller thickness (length d of one side of the resin pillar) and are arranged at a smaller pitch P and therefore at a higher density, requires a higher drive voltage.

Figure 6A:
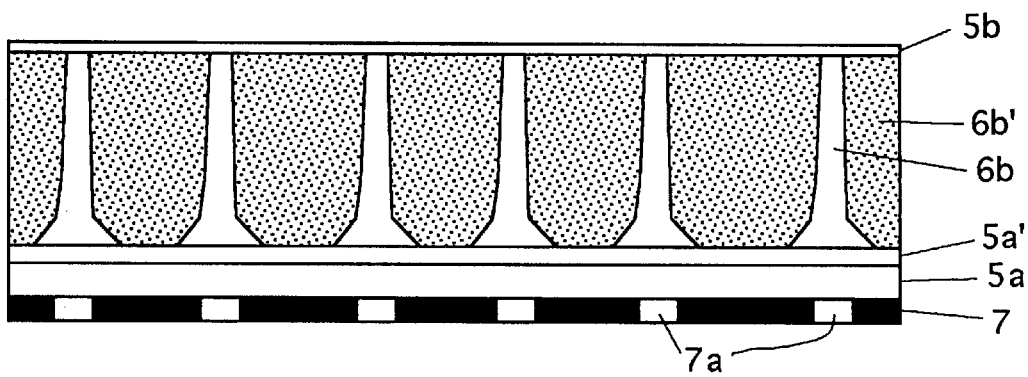
FIGS. 6(A), 6(B) and 6(C) show manners of producing the liquid crystal device of the embodiment of the invention including a step of preparing, in advance, a resin phase.

Referring to FIG. 6, another specific embodiment will be described below.

Embodiment 2

A glass plate provided with a transparent electrode having a sheet resistance of 100 Ω and a thickness of 120 μm was prepared as a first plate 5a. A mixture of monofunctional acrylate monomers R128H (manufactured by Nippon Kayaku Co., Ltd.) and polymerization initiator IRGACURE 184 (manufactured by Chiba Gaigy Co., Ltd.) added at a ratio of 5% by weight with respect to the whole weight was spread on the side of the first plate carrying the transparent electrode, and was held between the first plate and the provision plate formed of a PET film 5b with spacers of 10 μm therebetween.

Then, radiation of ultraviolet rays (6 mW/cm$^2$) was performed for 4 seconds with a photomask 7 in intimate contact with the first plate 5a so that the resin was polymerized. The radiation of ultraviolet rays was performed with a black absorbing layer disposed on the background so as to prevent reflection of the ultraviolet rays. A light source was spaced from the plate by 30 cm. The radiation rays were not parallel rays but were diverging rays.

The photomask 7 had three regions D1, D2 and D3 for one pixel. The regions D1, D2 and D3 were different from each other in pitch P of openings 7a and length d of one side of opening 7a. The region D1 had the pitch P of 40 μm and the length d of 20 μm, the region D2 had the pitch P of 60 μm and the length d of 30 μm, and the region D3 had the pitch P of 100 μm and the length d of 50 μm. These regions had the same opening rate.

Thereby, a group of the resin pillars of 10 μm in height was formed correspondingly to the mask pattern. A cross section of the structure including the resin pillars is fragmentarily shown in FIG. 6(A). The resin was held between the first plate 5a provided with an electrode layer 5a' and the PET film 5b, and the resin pillars 6b were formed at the positions corresponding to the openings 7a in the photomask 7 which was disposed outside the glass plate 5a. Each resin pillar 6b had a sloped form diverging toward the ultraviolet ray source. Uncured resin monomers 6b' were present between the resin pillars 6b.

Figure 6B:
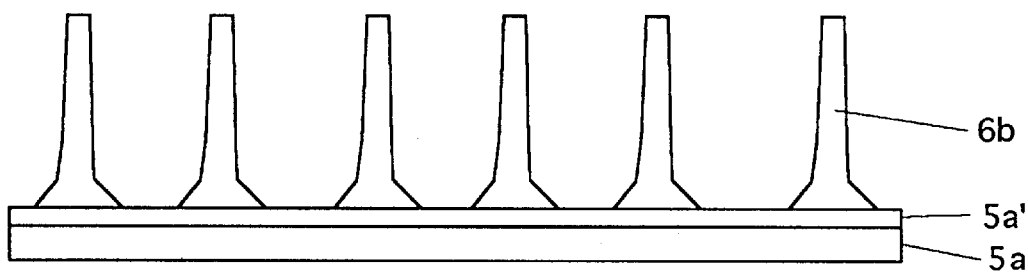

Then, the PET film was peeled off, and the uncured resin monomers were removed by washing with ethanol. In this state, the cross section of the structure including the resin pillars are shown in FIG. 6(B). This structure was observed from the side of the resin pillars 6b with a scanning electron microscope (SEM). It was confirmed that the resin remained only in the exposed portions.

Figure 6C:
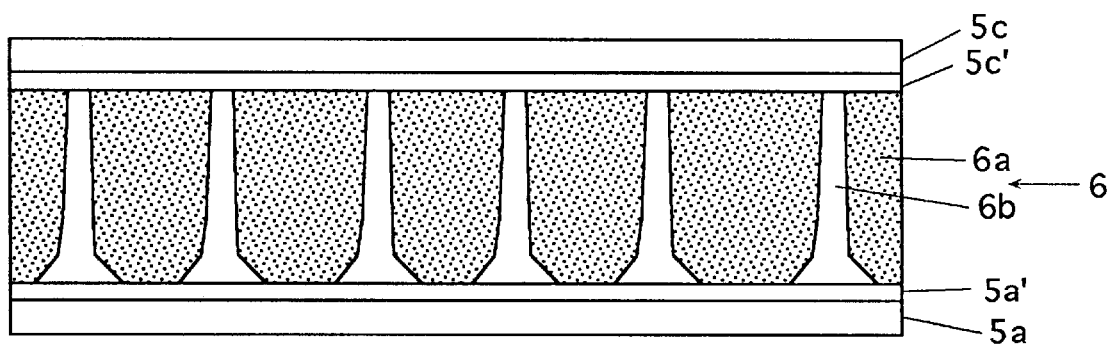

A mixture, which included the nematic liquid crystal material MN1000XX and ZLI-1565 mixed at a weight ratio of 1:1, was mixed with the chiral material, which was a mixture of CN and S811 mixed at a weight ratio of 2:1, to produce a chiral nematic liquid crystal material A. This liquid crystal material A contained the chiral material at 35.4% by weight with respect to the whole mixture, and thereby had the selective reflection wavelength of 560 nm. This liquid crystal material A was applied to spaces between the resin pillars. A new plate 5c having a new transparent electrode (second electrode) 5c' was attached to hold the liquid crystal material A and the resin pillars under pressure between the first and second plates, and the peripheries of the plates were sealed with ultraviolet-curing resin. The transparent electrode layer 5c' was directed inward when holding the resin pillars 6b and liquid crystal material 6a between the first plate 5a and the second plate 5c. In this manner, the liquid crystal device having the composite layer 6, of which cross section is shown in FIG. 6(C), was completed.

An AC pulse voltage of 5 msec was applied across the electrodes 5a' and 5c' while changing the magnitude of the voltage in various manner. When a high voltage pulse of, e.g., 200 V was applied, the liquid crystal device attained the planar orientation state, and the composite layer 6 exhibited a green appearance owing to the selective reflection. When a low voltage pulse of, e.g., 100 V was applied, the composite layer 6 attained a weakly scattering state and no longer exhibited the colored state. The respective states were maintained even after 24 hours from stop of the pulse voltage application. Thereby, it could be found that the display could be changed between the green and transparent appearances.

This liquid crystal device could perform a multi-tone display by applying the pulse voltage of various magnitudes to the composite layer which was initially in the planar orientation state. In the same manner as the specific embodiment 1 already described, the luminous reflectances of the regions D1, D2 and D3 were measured. As a result, the respective regions exhibited different reflectance curves. From this, it can likewise be understood that the multi-tone display can be performed by providing the plurality of regions corresponding to the regions D1–D3 in one pixel, respectively.

Figure 7:
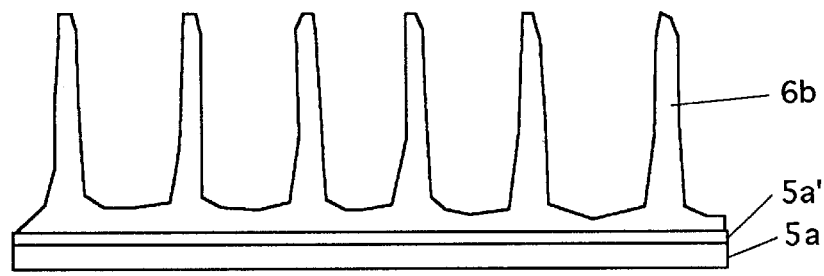
FIG. 7 shows a structure of a resin phase of still another specific embodiment of the invention in which ultraviolet-light irradiation for curing the resin is performed for an increased time.

In the specific embodiment 2, the time for radiation of the ultraviolet rays was changed from 4 seconds to 7 seconds. In this case, the resin pillars exhibited the state shown in FIG. 7 after removing uncured resin monomers by washing the same with ethanol. In this state, the resin layers were formed even on unexposed portions of the first plate. As a result, the voltage for selecting the planar orientation increased.

Figure 8A:
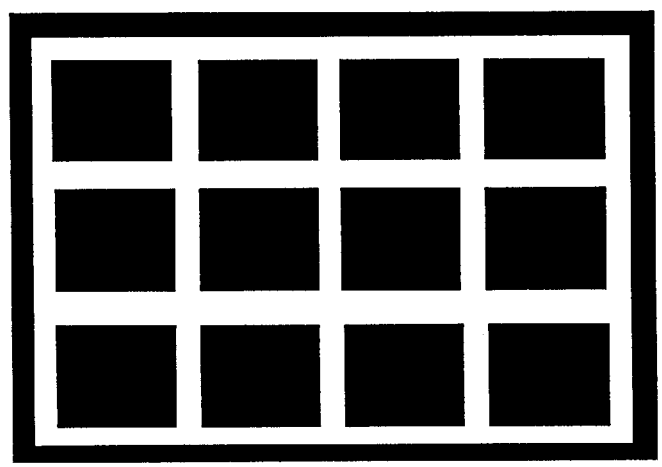
FIG. 8(A) shows another example of a pattern of openings in a photomask.
Figure 8B:
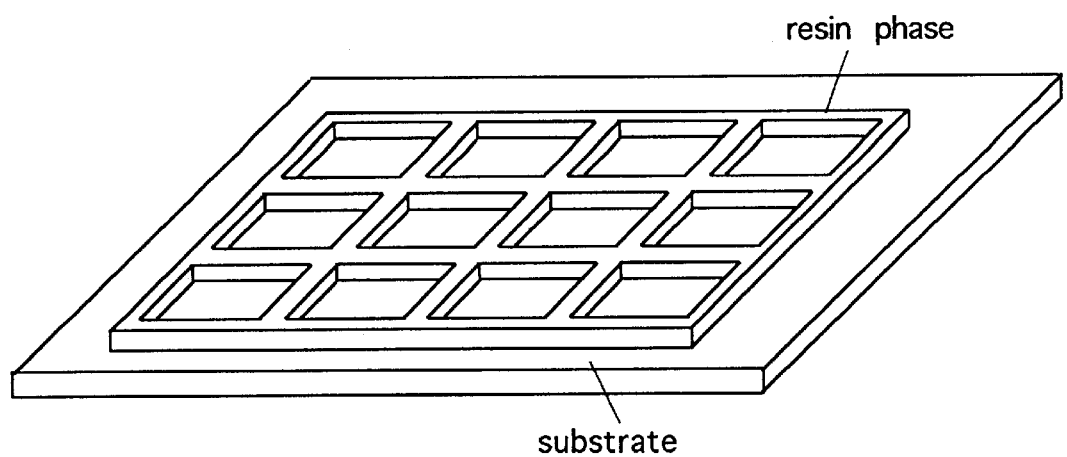
FIG. 8 shows a structure of a resin phase formed with the photomask having the opening pattern shown in FIG. 8(A)

In the specific embodiment 2, if the resin wall was formed with the photomask having a pattern shown in FIG. 8(A), a resin wall having a partition form shown in FIG. 8(B) was formed, in which case gas bubbles were liable to be mixed during the step of supplying the liquid crystal material.

Figure 9:
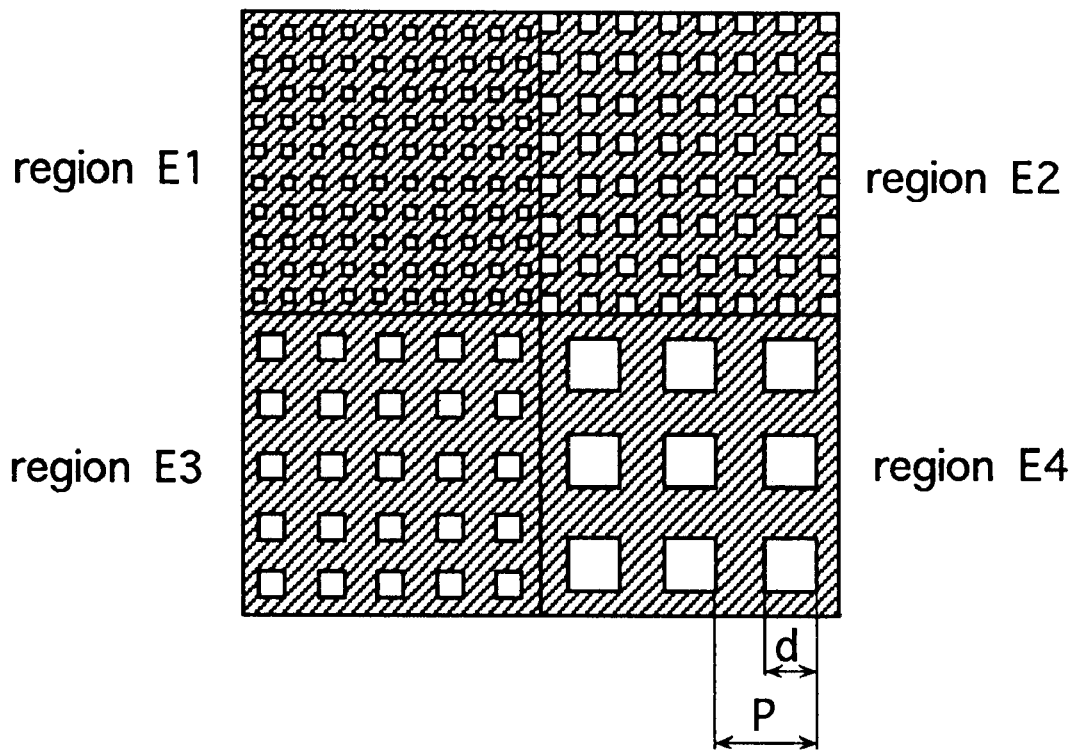
FIG. 9 shows a pattern of a mask used in yet another specific embodiment of the invention.

Still another specific embodiment of the invention will be described below with reference to FIG. 9. In this embodiment, resin pillars made of thermoplastic resin were produced by the screen printing method.

First, a glass plate (100 mm×100 mm), which was provided at its one surface with an ITO film forming the transparent electrode film, was processed by the photolithography to pattern the ITO film into stripes each having a line width of 600 μm and arranged at a pitch of 640 μm. Then, a spin coat method is executed to form a silicon oxide insulating film. A pattern of thermoplastic resin, i.e., polyester resin PES-360S30 (manufactured by Three Bond Co., Ltd.) was formed on the silicon oxide insulating film by the screen printing method as shown in FIG. 9. FIG. 9 shows a portion corresponding to one pixel defined by the matrix electrodes which were formed when the other plate provided with a similarly patterned ITO film and an insulating film thereon was overlaid on the foregoing glass plate. The region corresponding to one pixel included four regions E1, E2, E3 and E4 which were different from each other in arrangement pitch P of the resin pillars and length d of one side thereof. The region E1 had the pitch P of 30 $\mu$m, length d of 10 $\mu$m and opening rate of 89%. The region E2 had the pitch P of 40 $\mu$m, length d of 15 $\mu$m and opening rate of 86%. The region E3 had the pitch P of 60 $\mu$m, length d of 25 $\mu$m and opening rate of 82%. The region E4 had the pitch P of 100 $\mu$m, length d of 50 $\mu$m and opening rate of 75%. A continuous dam was simultaneously formed at the outer periphery of the plate except for a portion providing an inlet of the liquid crystal material. This dam was likewise made of polyester resin PES-360S30.

Thereafter, spacers (Micro Pearl SP-2075 manufactured by Sekisui Fine Chemical Co. Ltd.) having a particle diameter of about 7.5 $\mu$m were uniformly sprayed onto the whole surface of the plate by the dry spraying method at a density of 100 particles/mm$^2$.

A glass plate having a similarly patterned ITO film and a similar insulating film was prepared as the other plate, and was overlapped with the foregoing plate provided with the screen-printed resin. These plates were overlapped with each other such that the ITO patterns thereof were perpendicular to each other. This assembly was heated to 150° C., i.e., the softening point of the polyester resin while being pressured for five minutes with the pressure of 0.2 kg/cm$^2$. The assembly was then cooled to a room temperature while maintaining the pressurized state.

The liquid crystal material was supplied into empty cells thus formed by a vacuum injection at a temperature of 60° C. to form the liquid crystal device. This liquid crystal material was made of a nematic liquid crystal material E-31LV (manufactured by Merck Co., Ltd., $TN_{n-I}$=61.5° C.) and a chiral ingredient S-811 added thereto at a ratio of 24.5% by weight with respect to the whole weight. Then, the supply inlet was closed by ultraviolet-curing resin Photoreck A-704-60 (manufactured by Sekisui Fine Chemical CO., LTD.).

Through the foregoing steps, a light modulation device of a cholesteric liquid crystal material having the selective reflection wavelength of 550 nm and exhibiting the green reflection color was produced. A high voltage pulse of ±150 V and 5 msec (150 V at a row side and 0 V at a column side) was applied across the electrodes of the liquid crystal light modulation device to set the planar state in all the regions. Then, change in state of the liquid crystal material was observed while changing the peak value of the pulse voltage. As a result, it was found that the peak reflectance changed in accordance with the value of the applied voltage, and the multi-tone display could be performed. The peak value of the pulse voltage was changed by changing the voltage value on the column side.

An external pressure of 10 kg/cm$^2$ was applied to the foregoing liquid crystal light modulation device. After elimination of the external pressure, it was observed that the distance between the plates neither increased nor decreased, and no irregularity was present. Also, no change in drive voltage was caused by the voltage application. After this liquid crystal light modulation device was left at −25° C. for 24 hours, occurrence of gas bubbles was not found.

The embodiments 1 to 3 have been described in connection with the examples of liquid crystal devices including the resin pillars as the resin phase of the composite layer. However, the invention is not restricted to this. For example, the resin phase may take another form such as a network form. In this case, the resin phase has such a structure that a plurality of regions having different densities of mesh openings are present in one pixel, whereby a multi-tone display can be performed by controlling the applied voltage, as can be done also in the foregoing embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal device comprising:
   a pair of substrates; and
   a composite layer disposed between said pair of substrates, said composite layer including a cured resin phase and a liquid crystal phase of a liquid crystal material exhibiting a cholesteric characteristic, said composite layer having an area defining one pixel, and said area including a plurality of regions;
   wherein a structural condition of said cured resin phase of at least one of said plurality of regions is different from a structural condition of said cured resin phase of another of said plurality of regions so that an electro-optic response in at least one of said plurality of regions is different than an electro-optic response of another of said plurality of regions.

2. A liquid crystal device according to claim 1, wherein said structural condition is intensity.

3. A liquid crystal device according to claim 1, wherein said structural condition is form.

4. A liquid crystal device according to claim 1, wherein said composite layer includes a plurality of resin pillars as said resin phase.

5. A liquid crystal device according to claim 4, wherein an intensity of said resin pillars in at least one of said plurality of regions is different from an intensity of said resin pillars of another of said plurality of regions.

6. A liquid crystal device according to claim 4, wherein a pitch of said resin pillars in at least one of said plurality of regions is different from a pitch of said resin pillars of another of said plurality of regions.

7. A liquid crystal device according to claim 4, wherein a density of said resin pillars in at least one of said plurality of regions is different from a density of said resin pillars of another of said plurality of regions.

8. A liquid crystal device according to claim 4, wherein a configuration of said resin pillars in at least one of said plurality of regions is different from a configuration of said resin pillars of another of said plurality of regions.

9. A liquid crystal device according to claim 1, wherein said liquid crystal material includes a nematic liquid crystal material and a chiral ingredient.

10. A liquid crystal device according to claim 1, wherein said liquid crystal material exhibiting a cholesteric characteristic has a selective reflection wavelength in a visible range.

11. A liquid crystal device according to claim 1, wherein said liquid crystal material in all regions in said area defining one pixel can be set to a focal conic state.

12. A liquid crystal device according to claim 1, wherein each of said substrates has an electrode, and said area is positioned between said electrodes.

13. In a method of producing a liquid crystal device, the improvement comprising the steps of:

defining an area corresponding to one pixel; and forming a plurality of regions in a composite layer in said area, such that said composite layer including a cured resin phase and a liquid crystal phase of a liquid crystal material exhibiting a cholesteric characteristic, and a structural condition of said cured resin phase of at least one of said plurality of regions being different from a structural condition of said cured resin phase of another of said plurality of regions so that an electro-optic response in said at least one of said plurality of regions is different than an electro-optic response of said another of said plurality of regions.

14. A method of producing a liquid crystal device according to claim 13, wherein the step of forming a plurality of regions includes forming a plurality of regions such that an intensity of said resin phase in at least one of said plurality of regions is different from an intensity of said resin phase of another of said plurality of regions.

15. A method of producing a liquid crystal device according to claim 13, wherein a configuration of said resin phase in at least one of said plurality of regions is different from a configuration of said resin phase of another of said plurality of regions.

16. In a method of producing a liquid crystal device according to claim 13, wherein said composite layer includes a plurality of resin pillars as said resin phase.

17. A method of producing a liquid crystal device according to claim 16, wherein an intensity of said resin pillars in at least one of said plurality of regions is different from an intensity of said resin pillars of another of said plurality of regions.

18. A method of producing a liquid crystal device according to claim 16, wherein a pitch of said resin pillars in at least one of said plurality of regions is different from a pitch of said resin pillars of another of said plurality of regions.

19. A method of producing a liquid crystal device according to claim 16, wherein a density of said resin pillars in at least one of said plurality of regions is different from a density of said resin pillars of another of said plurality of regions.

20. A method of producing a liquid crystal device according to claim 16, wherein a configuration of said resin pillars in at least one of said plurality of regions is different from a configuration of said resin pillars of another of said plurality of regions.

21. A method of producing a liquid crystal device according to claim 13, wherein said liquid crystal material exhibiting a cholesteric characteristic includes a nematic liquid crystal material and a chiral ingredient.

22. A method of producing a liquid crystal device according to claim 13, wherein said liquid crystal material exhibiting a cholesteric characteristic has a selective reflection wavelength in a visible range.

23. A method of producing a liquid crystal device according to claim 13, wherein said area is defined between a pair of substrates; and said step of forming said regions including the steps of:

providing a composition of the liquid crystal material and a resin material between the pair of substrates; and separating the liquid crystal material from the resin material in at least one of said plurality of regions under a condition different from a condition under which the liquid crystal material of another of said plurality of regions is separated.

24. A method of producing a liquid crystal device according to claim 23, wherein said resin material is a photo-curing resin material; and said separating step comprises the steps of:

masking said composition with a mask having a plurality of regions, each of said plurality of regions having a plurality of openings, said plurality of openings of at least one of said plurality of regions being different from said plurality of openings of another of said plurality of regions; and exposing said composition to light through said mask.

25. A method of producing a liquid crystal device according to claim 24, wherein said plurality of openings is adapted to form resin pillars from said resin material during said exposing step.

26. A method of producing a liquid crystal device according to claim 25, wherein a pitch of said plurality of openings in at least one of said plurality of regions is different from a pitch of said plurality of openings in another of said plurality of regions.

27. A method of producing a liquid crystal device according to claim 25, wherein a density of said openings in at least one of said plurality of regions is different from a density of said openings in another of said plurality of regions.

28. A method of producing a liquid crystal device according to claim 25, wherein a configuration of said openings in at least one of said plurality of regions is different from a configuration of said openings in another of said plurality of regions.

29. A method of producing a liquid crystal device according to claim 24, wherein said photo-curing resin material is monomers and/or oligomers of monofunctional or multifunctional acrylate or methacrylate.

30. A method of producing a liquid crystal device according to claim 13, whrein said area is defined between a first substrate and a provisional substrate; and said step of forming the regions includes the steps of:

(1) supplying a resin material to a spce between said first substrate and said provisional substrate;

(2) curing said resin material in at least one of said plurality of regions under a condition different from a condition of another of said plurality of regions;

(3) removing said provisioal substrate;

(4) removing said uncured resin material;

(5) supplying the liquid crystal material into a space formed by said cured resin; and (6) arranging a second substrate at a position previously occupied by said provisional substrate and holding said resin and said liquid crystal material betwen said first substrate and said second substrate.

31. A method of producing a liquid crystal device according to claim 30, wherein said resin material is a photo-curing resin material; and
said step (2) comprises the steps of:
masking said resin material with a mask having a plurality of regions each having a plurality of openings, said plurality of openings corresponding to at least one of said plurality of regions having a condition that is different from a condition of another of said plurality of openings corresponding to another of said plurality of regions; and
exposing said resin material to light through said mask.

32. A method of producing a liquid crystal device according to claim 31, wherein
said plurality of openings are adapted to allow said resin phase to form a plurality of resin pillars.

33. A method of producing a liquid crystal device according to claim 32, wherein
a pitch of said openings in at least one of said regions is different from a pitch of said openings in another of said regions.

34. A method of producing a liquid crystal device according to claim 32, wherein
a density of said openings in at least one of said regions [in said mask] is different from a density of said openings in another of said regions.

35. A method of producing a liquid crystal device according to claim 32, wherein a configuration of said openings in at least one of said regions is different from a configuration of said openings in another of said regions.

36. A method of producing a liquid crystal device according to claim 31, wherein
said photo-curing resin material is monomers and/or oligomers of monofunctional or multifunctional acrylate or methacrylate.

37. A method of producing a liquid crystal device according to claim 13, wherein
said area is defined between a first substrate and a provisional substrate;
said step of forming the regions includes the steps of:
supplying a resin material to a space between said first substrate and said provisional substrate;
curing the resin material in at least one of said plurality of regions under a condition different from a condition of curing of said resin material in another of said plurality of regions;
removing said provisional substrate;
removing an uncured resin material;
arranging a second substrate at a position previously occupied by said provisional substrate to hold the resin between the first and second substrates;
supplying said liquid crystal material into a space between said first and second substrates; and
setting said liquid crystal phase to be continuously present in said composite layer.

38. A method of producing a liquid crystal device according to claim 37, wherein
said resin material is a photo-curing resin material; and
said curing step comprises the steps of:
masking said resin material with a mask having a plurality of sections, each of said plurality of sections having a plurality of openings, said openings corresponding to at least one of said plurality of sections being different from said openings corresponding to another of said plurality of sections; and
exposing said resin material to light through said mask.

39. A method of producing a liquid crystal device according to claim 38, wherein said openings are adapted to form a plurality of resin pillars as said resin phase.

40. A method of producing a liquid crystal device according to claim 39, wherein
a pitch of said openings in at least one of said regions is different from a pitch of said openings in another of said regions.

41. A method of producing a liquid crystal device according to claim 39, wherein
a density of said openings in at least one of said regions is different from a density of another of said openings in another of said regions.

42. A method of producing a liquid crystal device according to claim 39, wherein a configuration of said openings in at least one of said regions is different from a configuration of another of said openings in another of said regions.

43. A method of producing a liquid crystal device according to claim 38, wherein
said photo-curing resin material is monomers and/or oligomers of monofunctional or multifunctional acrylate or methacrylate.

44. A method of producing a liquid crystal device according to claim 13, wherein
said area is defined between a pair of substrates;
said step of forming the regions includes the steps of:
(1) supplying a resin material into a space between said pair of substrates,
(2) curing the resin material in at least one of said plurality of regions under a condition different from a condition of curing in another of said plurality of regions,
(3) removing an uncured resin material,
(4) supplying said liquid crystal material into a space between said pair of substrates; and
(5) setting said liquid crystal phase to be continuously present in said composite layer.

45. A method of producing a liquid crystal device according to claim 44, wherein
said resin material is a photo-curing resin material; and
said step (2) comprises the steps of:
masking said resin material with a mask having a plurality of sections each having a plurality of openings and being different from the others in condition of said openings, and
exposing said resin material to light through said mask.

46. A method of producing a liquid crystal device according to claim 45, wherein
said plurality of openings in said mask can provide said composite layer including a plurality of resin pillars as the resin phase.

47. A method of producing a liquid crystal device according to claim 46, wherein
a pitch of said openings in at least one of said sections is different from a pitch of said openings in another of said sections.

48. A method of producing a liquid crystal device according to claim 46, wherein
a density of said openings in at least one of said sections is different from a density of said openings in another of said sections.

49. A method of producing a liquid crystal device according to claim 46, wherein
a configuration of said openings in at least one of said sections is different from a configuration of said openings in another of said sections.

50. A method of producing a liquid crystal device according to claim 45, wherein said photo-curing resin material is monomers and/or oligomers of monofunctional or multifunctional acrylate or methacrylate.

51. A method of producing a liquid crystal device according to claim 13, wherein said area is defined on a first substrate; and said step of forming said regions comprises the steps of:
  (1) providing a mask having a plurality of sections each having a plurality of openings, said plurality of openings corresponding to one of said plurality of sections being different from said plurality of openings corresponding to another one of said plurality of sections, and
  (2) applying the resin onto the first substrate in accordance with the plurality of openings of said mask.

52. A method of producing a liquid crystal device according to claim 51, wherein said step of forming said plurality of regions further includes the steps of:
  (1) supplying the liquid crystal material into a space formed by said resin; and
  (2) holding said resin and said liquid crystal material between said first substrate and a second substrate.

53. A method of producing a liquid crystal device according to claim 51, wherein said step of forming said plurality of regions further includes the steps of:
  (1) holding the resin between said first substrate and a second substrate, and
  (2) supplying the liquid crystal material into a space between said first substrate and said second substrate; and
  (3) setting said liquid crystal phase to be continuously present in said composite layer.

54. A method of producing a liquid crystal device according to claim 51, wherein said resin is a thermoplastic resin.

55. A method of producing a liquid crystal device according to claim 51, wherein said resin is a thermosetting resin.

56. A liquid crystal device comprising:

a pair of substrates; and a composite layer of a plurality of cured resin pillars and a liquid crystal phase, each of said cured resin pillars formed so as to connect said pair of substrates and being arranged in a light modulating area of said liquid crystal device, said liquid crystal phase including a liquid crystal material exhibiting a cholesteric phase, wherein a spatial arrangement of said plurality of cured resin pillars is changed throughout said light modulating area in accordance with a predetermined rule.

57. A liquid crystal device in accordance with claim 56, wherein said light modulating area includes a plurality of regions, and wherein a spatial arrangement of said plurality of cured resin pillars within at least one of said plurality of regions is uniform throughout said at least one of said plurality of regions.

* * * * *

UNITED STATES PATENT AND TRADEMARK OFFICE
CERTIFICATE OF CORRECTION

PATENT NO. : 6,331,881 B1
DATED : December 18, 2001
INVENTOR(S) : Takuji Hatano et al.

It is certified that error appears in the above-identified patent and that said Letters Patent is hereby corrected as shown below:

Column 2,
Line 6, after "a", insert -- lower --.
Line 6, after "when", delete ",".
Line 8, after "resin", insert -- , --;
Line 16, delete the second instance of "the".

Column 22,
Line 49, delete "whrein", and insert -- wherein --.
Line 53, delete "spce", and insert -- space --.
Line 58, delete "provisioal", and insert -- provisional --.
Line 59, delete "said", and insert -- any --.
Line 64, delete "betwen", and insert -- between --.

Column 23,
Line 23, delete "[in said mask]".

Signed and Sealed this

Twenty-seventh Day of August, 2002

Attest:

Attesting Officer

JAMES E. ROGAN
*Director of the United States Patent and Trademark Office*